(12) United States Patent
Lucash (10) Patent No.: US 8,165,915 B1
(45) Date of Patent: Apr. 24, 2012

(54) ADVERTISEMENT CUSTOMIZATION

(75) Inventor: Nathan Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 600 days.

(21) Appl. No.: 12/178,529

(22) Filed: Jul. 23, 2008

(51) Int. Cl.
*G06Q 40/00* (2006.01)

(52) U.S. Cl. ............................................ 705/14; 705/35

(58) Field of Classification Search ................... 705/14, 705/35
See application file for complete search history.

(56) References Cited

U.S. PATENT DOCUMENTS

| | | | |
|---|---|---|---|
| 5,948,061 A | 9/1999 | Merriman et al. | |
| 6,167,382 A | 12/2000 | Sparks et al. | |
| 6,285,999 B1 | 9/2001 | Page | |
| 6,401,075 B1 | 6/2002 | Mason et al. | |
| 6,829,587 B2 | 12/2004 | Stone et al. | |
| 6,985,882 B1 | 1/2006 | Del Sesto | |
| 7,440,993 B1 | 10/2008 | Philyaw et al. | |
| 2008/0255946 A1* | 10/2008 | Altberg et al. | 705/14 |

FOREIGN PATENT DOCUMENTS

WO WO 97/21183 6/1997

OTHER PUBLICATIONS

AdForce, Inc., A Complete Guide to AdForce, Version 2.6, 1998, 285 pages.
AdForce, Inc., S-1/A SEC Filing, May 6, 1999, 9 pages.
Ad-Star.com website archive from www.archive.org, Apr. 12, 1997 and Feb 1, 1997, 43 pages.
Baseview Products, Inc., AdManagerPro Administration Manual v. 2.0, Dec. 1998, 226 pages.
Baseview Products, Inc., ClassManagerPro Administration Manual v. 1.0.5, Feb. 1, 1997, 157 pages.
Brin, Sergey et al., "The Anatomy of a Large-Scale Hypertextual Search Engine" *Computer Networks and ISDN Systems 30*, Issue 1-7, Apr. 1998, pp. 107-117.
Request for Reexamination of U.S. Patent No. 6,829,587 B2, Control No. 95/001,068, 85 pages, Dec. 7, 2004.
Zeff, R. et al., Advertising on the Internet, 2nd Ed., John Wiley & Sons, 1999, 440 pages.
95/001,068, Reexamination of Stone et al.

* cited by examiner

*Primary Examiner* — Thu Thao Havan
(74) *Attorney, Agent, or Firm* — Fish & Richardson P.C.

(57) ABSTRACT

Methods, systems and computer program products for customizing one or more advertisements are described. Specifically, advertisements may be customized using information from content of a web page prior to viewing by a user. For example, the rendering of the text of an advertisement may be in a same size, color, and font type as the text on the web page into which the advertisement is integrated. In addition, the advertisement may be displayed using a same color scheme as that used by the web page such that the advertisement may be enhanced in terms of notice and interaction by the user.

20 Claims, 7 Drawing Sheets

ADVERTISEMENT CUSTOMIZATION

TECHNICAL FIELD

The subject matter of this application is generally related to information presentation.

BACKGROUND

The World Wide Web uses a growing variety of media, styles and elements arranged in the form of web pages. These web pages contain various types of content including text, pictures and other compelling visual formats. A web page may designate one or more content areas for placement of an advertisement ("ad"). The ad may be in the form of a graphical ad, such as a banner ad, text only ad, image ad, audio ad, video ad, ad combining one of more of any of such components, executable code, or any other media, content, or interactive advertisement and the like. The ad may also include embedded information, such as links, meta-information, and/or machine executable instructions.

The ad also may have various intrinsic features. Such features may be specified by an application and/or by an advertiser, often depending on the type of ad. For example, in the case of a text ad, ad features may include a title line, ad text, and an embedded link. In the case of an image ad, ad features may include images, executable code, and an embedded link.

When an ad is displayed on a web page, the serving conditions of the ad may not be easily combined with the existing conditions serving the web page. For example, an ad might include rendered text using an "Arial" font, whereas the text displayed on the web page containing the ad may be rendered using a "Times New Roman" font. For example, the text in an ad may be rendered in font size "24" whereas the text displayed on the web page serving the ad may be rendered in font size "12". For example, the text in an ad may be rendered in one color (e.g., red) and the text displayed on the web page serving the ad may be rendered in another color (e.g., blue). To improve the "look and feel" of an ad, a publisher is generally supplied with various display options to ensure, for example, color, style, and format consistency between the ad and the content being published by the publisher. The publisher can manually specify the features of the ad, in addition to any advertiser or application specifications for the ad. For example, the publisher can select the color(s) used for rendering the text in an ad. This process, however, is time and labor intensive, and often tedious in nature.

SUMMARY

This specification describes methods, apparatus and computer program products related to the presentation of content in a media. By way of example, reference will be made to the display of ads on a web page. Other forms of content and other types of media (e.g., print, radio, video, television) are possible. In one example implementation, auto-customization of the display format and style of an ad on a web page may be accomplished by the real time inspection of a web page's content. An approximation may then be made to determine the most appropriate format and style to use for the ad. The format and style chosen for the ad may allow the ad to favorably integrate into its surroundings (i.e., blend well with the web page on which it is displayed).

In some implementations, a method includes: analyzing content of a document; identifying one or more characteristics associated with the content; customizing one or more advertisements based on the identified characteristics; and displaying the customized advertisements in the document.

In some implementations, a method includes: parsing content of a document; identifying a content area for placement of an advertisement; determining one or more characteristics surrounding the content area; and rendering the advertisement using the one or more determined characteristics.

In some implementations, a method includes: receiving information specifying an ad rendering area in a document; determining one or more characteristics associated within the specified ad rendering area; and applying the one or more characteristics to one or more advertisements prior to displaying the one or more advertisements.

The details of one or more embodiments of the subject matter described in this specification are set forth in the accompanying drawings and the description below. Other features, objects, and advantages of the subject matter will be apparent from the description, the drawings, and the claims.

DESCRIPTION OF DRAWINGS

Like reference symbols in the various drawings indicate like elements.

DETAILED DESCRIPTION

Advertising System Overview

Figure 1:
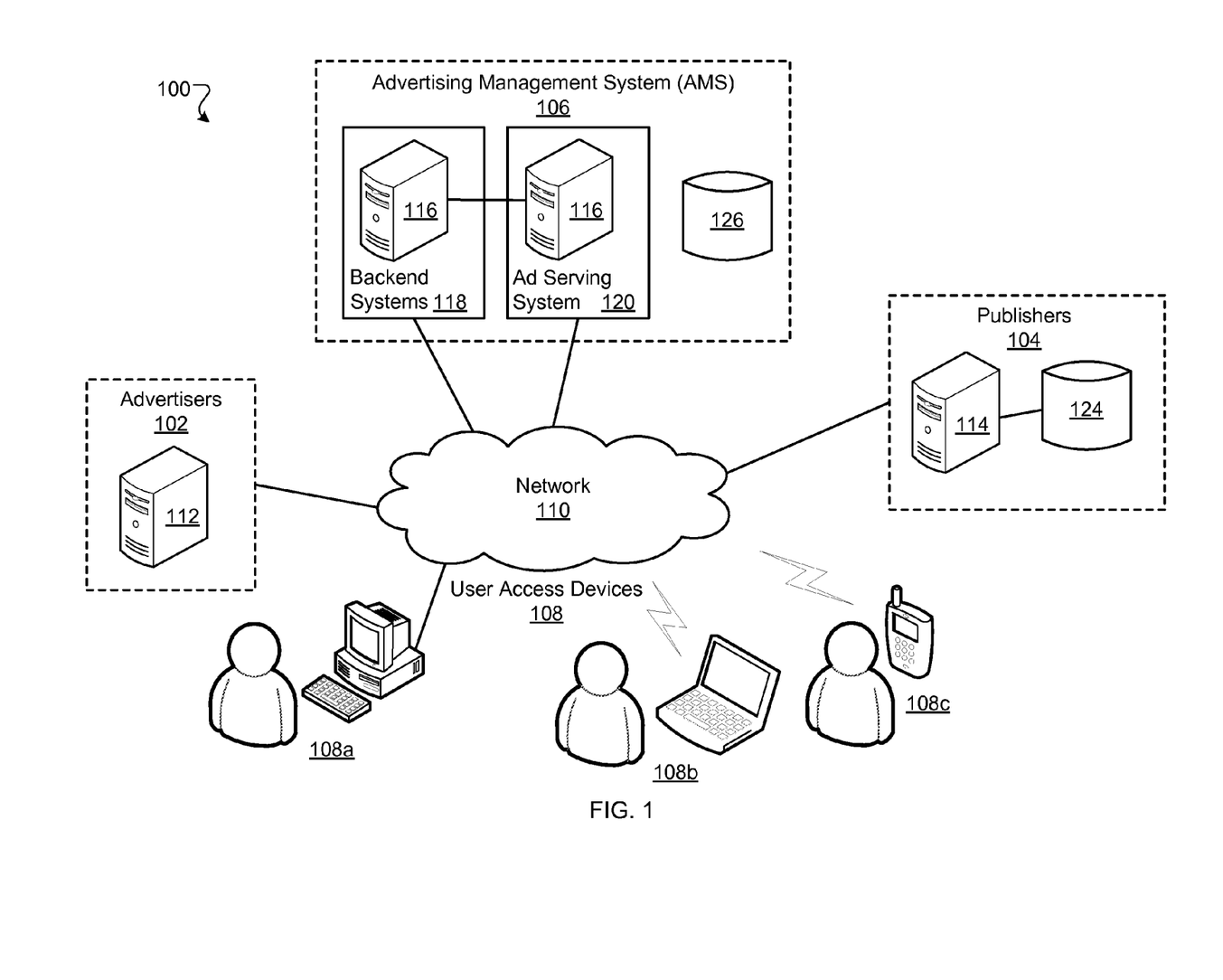
FIG. 1 is a block diagram showing an example advertising system.

FIG. 1 is a block diagram showing an example advertising system 100. The system 100 may receive and provide content to users, publishers, and advertisers. For example, the content may include web documents, links, images, advertisements, and other information. In some implementations, the system 100 may receive content from advertisers and deliver or serve the advertiser content to users when the users' access content is associated with publishers (e.g., a publisher web page). In some implementations, the system 100 may select and deliver advertiser content that is contextually relevant and of an appropriate format and style to the publisher content accessed.

In some implementations, content may include one or more advertisements. An advertisement or an "ad" may refer to any form of communication in which one or more products, services, ideas, messages, people, organizations or other items are identified and promoted. Ads may not be limited to commercial promotions or other communications. An ad may be a public service announcement or any other type of notice, such as a public notice published in printed or electronic press or a broadcast. An ad may be referred to or include sponsored content.

In some implementations, ads may be communicated via various mediums and in various forms. For example, ads may be communicated through an interactive medium, such as the internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads may also be communicated through RSS (Really Simple Syndication) feeds, radio channels, television channels, print media, and other media.

The term "ad" may refer to either a single "creative" and/or an "ad group." A creative may be any entity that represents one ad impression. An ad impression refers to any form of presentation of an ad such that it is viewable/receivable to a user. In some implementations, an ad impression may occur when displaying an ad on a display device of a user access device. For example, an ad group may be an entity that represents a group of creatives that share a common characteristic, such as having the same ad targeting criteria. Ad groups may be used to create an ad campaign.

In some implementations, ads may be embedded within other content. For example, ads (e.g., newspaper subscription advertisement) may be displayed with other content (e.g., newspaper articles) in a web page associated with a publisher (e.g., a news content provider). When displayed, the ads may occupy an ad space "slot" or "block." An ad space may be any element that allows rendering of information. In some examples, the ad space may be implemented as a HyperText Markup Language (HTML) element, such as an inline frame (I-Frame) or other type of embeddable display element. The ad space may include any portion, or all, of a user display. The ad space may be a discrete, isolated portion of a display or it may be blended and dispersed throughout a display. The ad space may be a discrete element or it may be dispersed in multiple sub-elements.

In some implementations, ads may be integrated with the surrounding content of the web page they are displayed with, prior to viewing by a user. For example, the rendering of the text of an ad may be in the same or a complementary size, color, and font type as the text on the web page into which it is integrated. In addition, the ad may be displayed using the same color scheme or "chrome" of the surrounding web page into which it is integrated. Typically, the better integrated into its web page surroundings an ad is, the better the ad will perform in terms of notice and interaction by a user.

In some implementations, the advertising system 100 may dynamically determine how to render an ad. For example, the advertising system 100 may determine how much space a particular ad may occupy. Moreover, the advertising system 100 may determine if the ad may be expanded, shrunk, side-barred, bannered, popped up, or otherwise displayed alone or with other ads within a specific publisher's website. For example, the advertising system 100 may use ad features (e.g., title, text, links, executable code, images, audio, embedded information, targeting criteria, etc.) to identify if an ad may be served in a particular ad block.

In determining how to render an ad, the advertising system 100 may determine how to best integrate the ad into its web page surroundings. Prior to rendering the ad, the advertising system 100 may determine specific data related to the web page (e.g., types of fonts used, colors, font sizes, color scheme used by the web page, etc.). Using this data, the advertising system 100 may select fonts, colors, font sizes, chromes, etc. that may best render the ad in order for it to integrate well into the web page.

A "click-through" of a displayed ad may occur when a user clicks or otherwise selects the ad. A "conversion" may occur when a user consummates a transaction related to a given ad. For example, a conversion may occur when a user clicks on an ad, which refers them to the advertiser's web page, and consummates a purchase on the advertiser's web page before leaving that web page. In another example, a conversion may be the display of an ad to a user and a corresponding purchase on the advertiser's web page within a predetermined time (e.g., seven days).

As shown in FIG. 1, the advertising system 100 may include one or more advertisers 102, one or more publishers 104, an advertising management system (AMS) 106, and one or more user access devices 108 (user access device 108a, user access device 108b, user access device 108c). All of the elements may be coupled to a network 110. Each of the elements 102, 104, 106, 108, and 110 in FIG. 1 may be implemented or associated with hardware components, software components, or firmware components, or any combination of such components. For example, the elements 102, 104, 106, 108, and 110 may be implemented or associated with general purpose servers, software processes and engines, and/or various embedded systems. For example, the elements 102, 104, 106, and 110 may serve as an ad distribution network. While reference is made to distributing advertisements, the system 100 may be suitable for distributing other forms of content including other forms of sponsored content.

The advertisers 102 may include any entities that are associated with ads. The advertisers 102 may provide, or be associated with, products and/or services related to ads. For example, the advertisers 102 may include, or be associated with, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain, and/or track ads, which may be related to products or services offered by or otherwise associated with the advertisers. The advertisers 102 may include, or maintain, one or more data processing systems 112, such as servers or embedded systems, coupled to the network 110. The advertisers 102 may include or maintain one or more processes that run on one or more data processing systems.

The publishers 104 may include any entities that generate, maintain, provide, present, and/or process content in the advertising system 100. The publisher "content" may include various types of content including web-based information, such as articles, discussion threads, reports, analyses, financial statements, music, video, graphics, search results, web page listings, information feeds (e.g., RSS feeds), television broadcasts, radio broadcasts, printed publications, etc. The publishers 104 may include or maintain one or more data processing systems 114, such as servers or embedded systems, coupled to the network 110. The publishers 104 may include or maintain one or more processes that run on data processing systems. In some implementations, the publishers 104 may include one or more content repositories 124 for storing content and other information.

In some implementations, the publishers 104 may include content providers. For example, content providers may include those with an internet presence, such as online publication and news providers (e.g., online newspapers, online magazines, television websites, etc.), or online service providers (e.g., financial service providers, health service providers, etc,). The publishers 104 may also include television broadcasters, radio broadcasters, satellite broadcasters, print publishers and other content providers. One or more of the publishers 104 may represent a content network that is associated with the AMS 106.

In some implementations, the publishers 104 may include search services. For example, search services may include those with an internet presence, such as online search services that search the worldwide web, online knowledge database search services (e.g., dictionaries, encyclopedias), etc.

The publishers 104 may provide or present content via various mediums and in various forms, including web based and non-web based mediums and forms. The publishers 104 may generate and/or maintain such content and/or retrieve the content from other network resources.

The AMS 106 may manage ads and provide various services to the advertisers 102, the publishers 104, and the user access devices 108. The AMS 106 may store ads in an ad repository 126 and facilitate the distribution or targeting of ads through the advertising system 100 to the user access devices 108.

The AMS 106 may include one or more data processing systems 116, such as servers or embedded systems, coupled to the network 110. The AMS 106 may also include one or more processes, such as server processes. In some implementations, the AMS 106 may include an ad serving system 120 and one or more backend processing systems 118. The ad serving system 120 may include one or more data processing systems 116 and may perform functionality associated with delivering ads to publishers or user access devices. The backend processing systems 118 may include one or more data processing systems 116. The backend processing systems 118 may perform functionality associated with identifying relevant ads to deliver, customizing ads, performing filtering processes, generating reports, maintaining accounts and usage information, and other backend system processing. The AMS 106 may use the backend processing systems 118 and the ad serving system 120 to distribute ads from the advertisers 102 through the publishers 104 to the user access devices 108.

In some implementations, the AMS 106 may provide various features to the publishers 104. The AMS 106 may deliver ads (associated with the advertisers 102) to the user access devices 108 when users access content from the publishers 104. For example, the AMS 106 may deliver ads that are relevant to publisher sites, site content, and publisher audiences. In another example, the AMS 106 may allow the publishers 104 to search and select specific products and services as well as associated ads displayed with content provided by the publishers 104. In some implementations, the publishers 104 may search through ads in the ad repository 126 and select certain ads for display with their content.

The user access devices 108 may include devices capable of receiving information from the network 110. The user access devices 108 may include general computing components and/or embedded systems optimized with specific components for performing specific tasks. Examples of user access devices 108 may include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, and other electronic devices. The user access devices 108 may also include various other elements, such as processes running on various machines. In some implementations, the user access devices are not electronic (e.g., printed publications).

The network 110 may include any element or system that facilitates communications among and between various network nodes, such as elements 108, 112, 114, and 116. The network 110 may include one or more telecommunications networks, such as computer networks, telephone or other communications networks, the internet, etc. The network 110 may include a shared, public, or private data network (e.g., an intranet, a peer-to-peer network, a private network, a virtual private network (VPN), etc.) encompassing a wide area (e.g., WAN) or local area (e.g., LAN). In some implementations, the network 110 may facilitate data exchange by way of packet switching using the Internet Protocol (IP). The network 110 may also facilitate wired and/or wireless connectivity and communication.

In some implementations, user access devices 108 and advertisers 102 may provide usage information to the AMS 106 (e.g., whether or not a conversion or click-through related to an ad has occurred). This usage information may include measured or observed user behavior related to served ads. For example, the AMS 106 may perform financial transactions, such as crediting publishers 106 and charging advertisers 102 based on the usage information.

In some implementations, a publisher may be a search service. A search service may receive queries for search results. In response, the search service may retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia, and in U.S. Pat. No. 6,285,999, both of which are incorporated herein by reference each in their entirety. For example, search results may include lists of web page titles, snippets of text extracted from those web pages, and hypertext links to those web pages, and may be grouped into a predetermined number of search results.

For example, a publisher (e.g., one of the publishers 104) may receive a search query request from a user access device (e.g., user access device 108*a*). In response, the publisher may retrieve relevant search results for the query from an index of documents (e.g., an index of web pages, which may be included in a content repository 124). The publisher may also submit a request for ads to the AMS 106. The ad request may include the desired number of ads. The number of requested ads may depend on the search results, the amount of screen or page space occupied by the search results, the size and shape of the requested ads, etc. The ad request may also include the search query (as entered or parsed), information based on the query (e.g., geo-location information, whether the query came from an affiliate and an identifier of such an affiliate, etc.), and/or information associated with, or based on, the search results. For example, the information may include identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores may be computed from dot products of feature vectors corresponding to a search query and document, page rank scores, and/or combinations of IR scores and page rank scores, etc.

A user access device (e.g., user access device 108*a*) may present in a viewer (e.g., a browser or other content display system) the search results integrated with one or more of the ads provided by the AMS 106. In some implementations, the user access device may transmit information about the ads back to the AMS 106, including information describing how, when, and/or where the ads are to be/were rendered (e.g., in HTML or JavaScript®).

In some implementations, a publisher may be a general content provider. For example, a publisher (e.g., one of the publishers 104) may receive a request for content from a user access device (e.g., user access devices 108a). In response, the publisher may retrieve the requested content (e.g., access the requested content from the content repository 124) and provide or present the content to the user access device 108a. The publisher may also submit a request for ads to the AMS 106. The ad request may include the desired number of ads. The ad request may also include content request information. This information may include the content itself (e.g., the web page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc. In response to the ads request, the AMS 106 may retrieve the requested ads (e.g., access the requested ads from the ad repository 126) and provide or present the ads to the requesting publisher.

A user access device (e.g., user access device 108a) may present in a viewer (e.g., a browser or other content display system) the content integrated with one or more of the ads provided by the AMS 106. In some implementations, the user access device may transmit information about the ads back to the AMS 106, including information describing how, when, and/or where the ads are to be/were rendered (e.g., in HTML or JavaScript®).

For purposes of explanation only, certain aspects of this disclosure are described with reference to the discrete elements illustrated in FIG. 1. The number, identity and arrangement of elements in the system 100 are not limited to what is shown. For example, the system 100 may include any number of geographically-dispersed advertisers 102, publishers 104 and/or user access devices 108, which may be discrete, integrated modules or distributed systems. Similarly, the system 100 is not limited to a single AMS 106 and may include any number of integrated or distributed AMS systems or elements.

Ad Customization

In some implementations, in addition to content, the publishers 104 may integrate or combine retrieved content with ads that are related or relevant to the retrieved content for display to users. As was previously described, retrieved content may include general content as well as search results. The AMS 106 may provide the publisher relevant ads for combining with content to present in a viewer on a user access device. In some implementations, the publisher may retrieve content for display on a particular user access device (e.g., user access device 108a) and may then send the content to the user access device 108a along with code that causes one or more ads from the AMS 106 to be displayed to the user. In some implementations, the publishers 104 may retrieve content, retrieve one or more relevant ads from AMS 106, and then integrate the ads and the retrieved content to form a content page for display to the user.

Ad rendering within retrieved content may be based on content information. For example, content information may be the web page itself (or portion thereof) or other content documents that may represent or render the web page (e.g., an HTML document). A publisher may send content to a user access device for display along with information specifying where within the content to render the ad. The user access device may provide content information to the AMS 106. The AMS 106 may supply the ad information for rendering within the specified area of the content.

In some implementations, the AMS 106 may determine the style characteristics within the specified ad rendering area of the content, and apply those style characteristics to the ad information prior to sending the information to the user access device for rendering. For example, the AMS 106 may determine that a user access device will render an ad in a section of a web page whose rendered content is in a Tahoma font. As previously described, the optimal customization characteristics for an ad integrated into content and displayed to a user are to render the ad in the same style (e.g., using the same characteristics) as its surrounding content. Therefore, in this example, the AMS 106 may provide ad information to the user access device to render the ad in a Tahoma font. In some implementations, the information may characterize all or only a relevant portion (e.g., a portion in proximity to the ad slot) of the content that is to be presented along with the ad.

In some implementations, a publisher may submit a request for ads to the AMS 106, and integrate the retrieved ads with retrieved content. User access devices 108 may display the integrated ads and content information to the user. As previously described, it may be beneficial to advertisers 102 to have their ads well integrated into the surrounding content. For example, the requesting publisher may derive the optimal styles to use in an ad's presentation on a content page by programmatically experimenting amongst several choices using a trial and error type of process. The requesting publisher may supply a user access device with information for customizing the look and feel of an ad (e.g., font style, font colors, font sizes, general and background color scheme, etc.) for display to a user.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Example Data Flow

Figure 2:
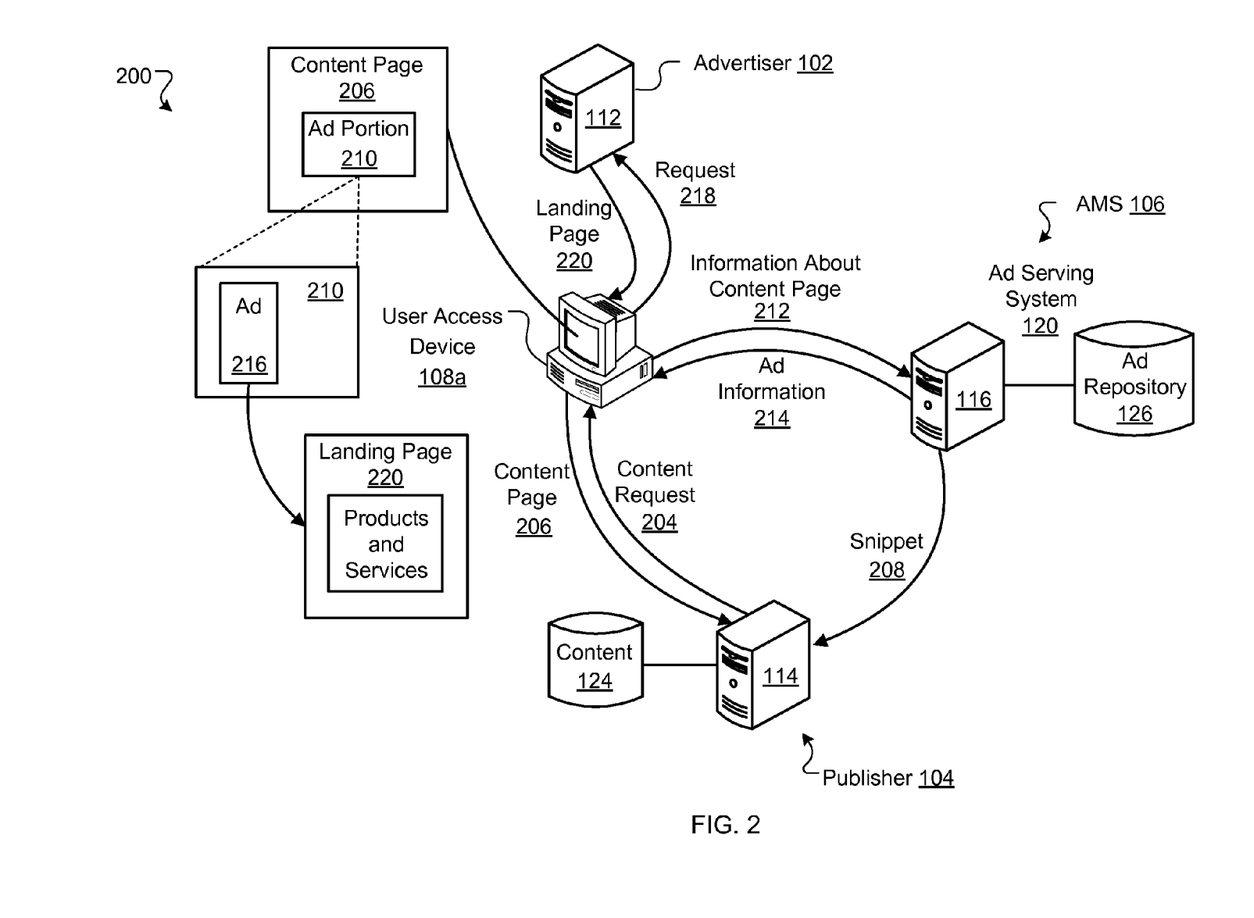
FIG. 2 is a data flow diagram showing an example data flow consistent with an example advertising system.

FIG. 2 is a data flow diagram showing an example data flow 200. In particular, the data flow 200 shows ad component interactions when ads are being served (e.g., by the advertising system 100). It should be noted that the data flow 200 is merely an example illustration and not intended to be restrictive. Other data flows are possible, and the illustrated events and their particular order in time may vary depending on a specific design and application.

As shown in FIG. 2, a publisher 104a may receive a content request 204 from the user access device 108a. For example, the content request 204 may be a request for a web document on a given topic (e.g., pet food suppliers). In response to the request 204, the publisher may retrieve relevant content (e.g., the web page for ExamplePetSupplyRetailer) from the content repository 124.

The publisher 104a may respond to the content request 204 by sending a content page 206 or other presentation, representation, or characterization of the content to the requesting user access device 108a. The content page 206 may include the requested content (e.g., the web page for ExamplePetSupplyRetailer) as well as a code snippet 208 associated with an ad. For example, a code snippet may refer to a method used by one device (e.g., a server) to ask another device (e.g., a browser running on a client device) to perform actions after or while downloading information. In some implementations, a code snippet may be in JavaScript® code or may be part of the HTML or other web page markup language or content.

In some implementations, the AMS 106 may send the code snippet 208 to the publisher 104*a* and/or the user access device 108*a*. In some implementations, the code snippet 208 may originate and/or be provided from other sources. As the requesting user access device 108*a* loads the content page 206, the code snippet 208 causes the user access device 108*a* to contact the AMS 106 and receive additional code (e.g., Java Script®), which causes the content page 206 to load with an ad portion 210.

The ad portion 210 may be similar to, or include, an ad block. The ad portion 210 may include any element that allows embedding of information within the content page 206. In some implementations, the ad portion 210 may be an HTML element (e.g., an I-Frame) or other type of frame.

In some implementations, the ad portion 210 may be hosted by the AMS 106 or the publisher 104*a* and may allow content (e.g., ads) from the AMS 106 or the publisher 104*a* to be embedded inside the content page 206. Parameters associated with the ad portion 210 (e.g., its size, shape, and other style characteristics) may be specified in the content page 206 (e.g., in HTML), so that the user access device 108*a* may present the content page 206 while the ad portion 210 is being loaded.

In some implementations, the ad portion 210 may send the AMS 106 information about the content page 212. The information 212 may include information describing the manner (e.g., how, when, and/or where) in which ads may be rendered by the user access device 108, and information for automatically expanding or shrinking an ad to fit a particular ad block. The information 212 may also specify a quantity of ads desired.

The information about the content page 212 may also include information associated with the content displayed in content page 206. This information may include a URL associated with the requested content page 206; the requested content itself; a category corresponding to the requested content or the content request; part or all of the content request 204; content age; content type (e.g., text, graphics, video, audio, mixed media, etc.); geo-location information; etc.

In some implementations, the information 212 associated with the displaying of the content page 206 may include information related to the computed style of document nodes included in a document object model (DOM) used to represent the content page 206. A DOM may generally represent a hierarchy of nodes in an electronic document (e.g., HTML elements, XML elements, etc.). A DOM node may represent a fundamental component of a hypertext electronic document, such as a title, a header, a footer, an advertisement, an image, a menu, etc. Information about the computed style (e.g., font type, size, color, format, etc.) of each DOM node (e.g., the title, header, footer, etc.) may be collected and analyzed to determine a style for an ad 216 displayed in the ad portion 210 of content page 206.

In some implementations, the AMS 106 may parse the DOM used to represent the content page 206 and determine the computed style of each DOM node. The DOM representing the content page 206 may be included in the information about the content page 212 that the user access device 108*a* sends to the AMS 106. The AMS 106, utilizing the backend system 118, for example, may analyze the computed style of each DOM node and make a "best guess" as to a compatible style to use for an ad. The compatible style for the ad may be a style that allows the ad to integrate the best with the content page 206, allowing the ad to be noticed and interacted with by the user.

In some implementations, the computed style for each DOM node may be included in external cascading style sheets (CSS). Cascading style sheets describe how to present a document (style a web page) written in a markup language (e.g., HTML, XML, etc.) for viewing by a user. CSS may define colors, fonts, layout, and other aspects of web page content presentation. CSS may enable the separation of content (written in HTML or a similar markup language) from presentation (written in CSS). The user access device 108*a* may send the web page document (e.g., an HTML file) and the CSS as information about the content page 212 to the AMS 106. As previously described, the AMS 106 may parse the received information to determine the computed style of each DOM node, analyze the computed style of each DOM node, and make a "best guess" as to a compatible style to use for an ad.

The AMS 106 may use the style information gathered from the analysis of the content page 206 to determine how to best render an ad for display on the content page 206 (e.g., ad 216 in ad portion 210) such that it will be noticed and interacted with by a user. For example, the AMS 206 may perform an analysis of a web page document (e.g., an HTML file) to determine the style content of the document. A font style may include information about the font type, font size, font color, font format, and other font characteristics. A color scheme may include information about the colors used in the background and other areas of the web page. The advertising system 100 may use a variety of techniques for determining the "best guess" font style and color scheme to use for rendering an ad on a content page.

In some implementations, a matching function may determine the font style to use to render the ad. The matching function may use the ad unit itself as if it were included in the web page document (e.g., an HTML file) as a block of text (as opposed to an I-Frame, for example). In some implementations, the most frequently used font style in a web page document may be used to render the ad.

In some implementations, weighted font style information may be associated with a DOM node. The ad may then be rendered using the most heavily weighted font style information. For example, the weighting factor for the DOM node may be a function of the size of the pixel area covered by the DOM node (e.g., the larger the pixel area the more heavily weighted the DOM node will be). For example, the weighting factor for the DOM node may be a function of the length of the text included within each DOM node (e.g., the greater the amount of text included within the DOM node the more heavily weighted the DOM node will be). For example, the weighting factor for the DOM node may be a function of the proximity of the DOM node to the ad unit (e.g., the closer the DOM node to the location in the content page 206 of the ad unit (e.g., ad portion 210), the more heavily weighted the DOM node will be). For example, the weighting factor for the DOM node may be a function of the distance of the DOM node from the center of the ad viewing area in the content page (e.g., the closer the DOM node to the center of the ad viewing area (e.g., the center of the ad portion 210) in the content page 206, the more heavily weighted the DOM node will be).

In some implementations, a Monte Carlo sampling of the DOM nodes and a ray tracer implementation may be used to statistically determine the font style information to use to render the ad. This implementation may involve the use of fewer DOM nodes.

In some implementations, the user access device 108*a* may render and display the content page 206 on the display of the device 108*a*. For example, the user access device 108*a* may render, display and capture the displayed image as a bit mapped image. The user access device 108a may send the captured display image to the AMS 106. The AMS 106, using the backend system 118, for example, may analyze the captured display image (e.g., use optical character recognition (OCR) techniques to determine the type, size, and location of rendered fonts in the display image). The results of the analysis may be used to customize the fonts used in an ad by creating style information associated with the ad that may be sent along with the ad information 214 to the user access device 108a for rendering and display on the content page 206 in the ad portion 210 as ad 216, for example.

In some implementations, an index of web page documents (e.g., the content repository 124) may include style information associated with each web page document stored. For example, the publisher 104a, in an offline process using one or more data processing systems 114, may parse a web page document looking at the markup language and content (e.g., HTML command usage) to determine the fonts and colors used on the web page. For example, the fonts used may be identified by font names or known font modifying HTML attributes. For example, examining the colors in the background as well as other boxes located on the web page may identify the colors used on the web page. The resulting font usage and identification information, and color information may be stored, along with the web page document, in the content repository 124 as style information. The publisher 104a may retrieve this information along with the requested web page document from the content repository 124 and send it to the user access device 108a. The user access device 108a may send the style information to the AMS 106 in the information about the content page 212. The AMS 106 may use this style information to customize an ad for display in the ad portion 210 of content page 206 (e.g., ad 216).

The AMS 106 may use the style information gathered from the analysis of the content page 206 to determine how to best render an ad for display on the content page 206 (e.g., ad 216 in ad portion 210) such that it will be noticed and interacted with by a user.

Ads, each including their associated style information, may be included in the ad information 214 that the AMS 106 sends to the user access device 108a. The ad information 214 may include one or more ads 216 for placement in the ad portion 210 of the content page 206. In some implementations, the ad information 214 may also include a signed or encoded specification of an ad. Ads included in the ad information 214 may populate the ad portion 210 of the content page 206 (e.g., ad 216).

In some implementations, the ad information 214 may include ads that are relevant to user interest. The AMS 106 may retrieve and provide relevant ads based on the information 212 received from the user access device 108a. For example, the AMS 106 may retrieve the ad information 214 from the ad repository 126 using the backend processing systems 118. The AMS 106 may retrieve relevant ads using information from a crawling module, various keywords, various statistical associations between ads and content, and/or preference information associated with the publishers.

In general, when a user clicks on or otherwise interacts with the displayed ad 216, an embedded code snippet may direct the user access device 108a to contact the AMS 106. During this event, the user access device 108a may receive an information parcel, such as a signed browser cookie, from the AMS 106. This information parcel may include information, such as an identifier of the selected ad 216, an identifier of the publisher 104a, and the date/time the ad 216 was selected by the user. The information parcel may facilitate processing of conversion activities or other user transactions.

The user access device 108a may then be redirected to the advertiser 102 associated with the selected ad 216. The user access device 108a may send a request 218 to the associated advertiser 102 and then load a landing page 220 from the advertiser 102. The user may then perform a conversion action at the landing page 220, such as purchasing a product or service, registering, joining a mailing list, etc. The AMS 106 may provide a code snippet, which may be included within a conversion confirmation page script such as a script within a web page presented after the purchase. The user access device 108a may execute the code snippet, which may contact the AMS 106 and report conversion data to the AMS 106. The conversion data may include conversion types and numbers as well as information from cookies. The conversion data may be maintained in a conversion data repository.

FIG. 2 is an example only and not intended to be restrictive. Other data flows may therefore occur in the system 100 and, even with the data flow 200, the illustrated events and their particular order in time may vary. Further, the illustrated events may overlap and/or may exist in fewer steps. Moreover, certain events may not be present and additional and/or different events may be included.

Ad Customization Process

Figure 3:
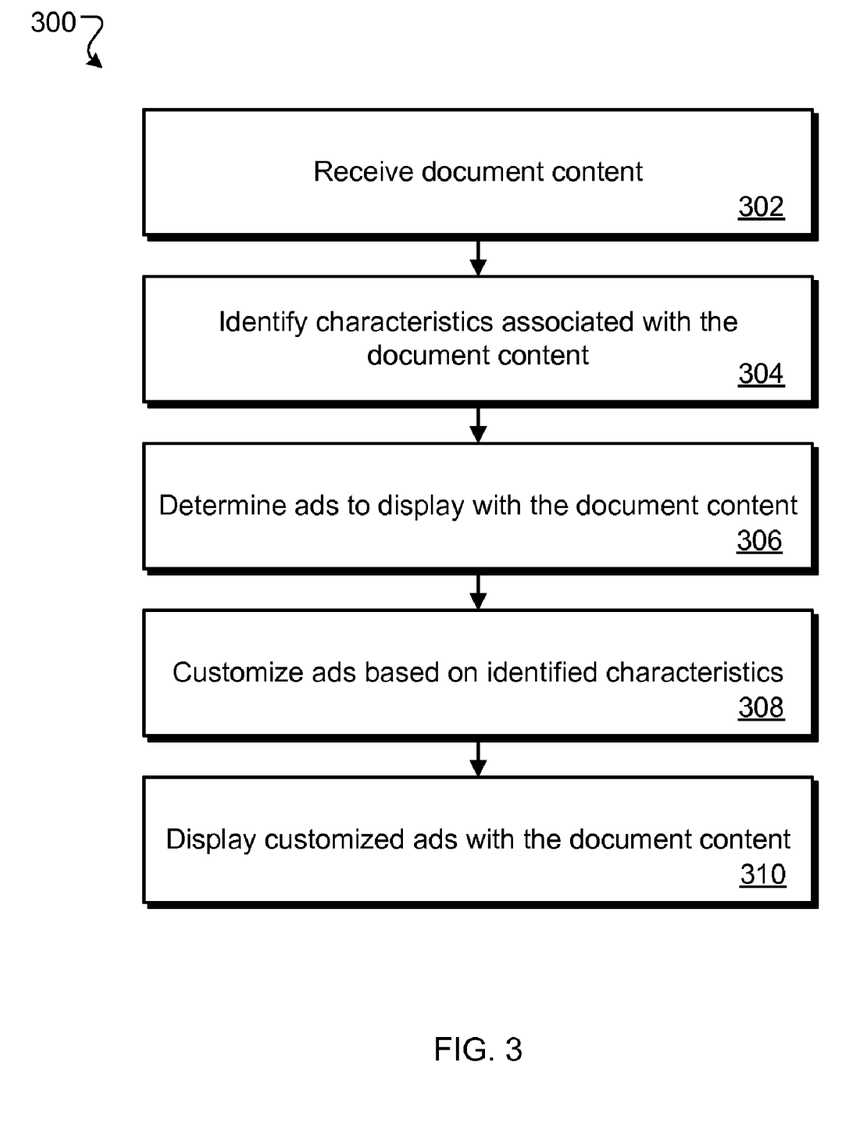
FIG. 3 is a flow diagram of an example ad customization process.

FIG. 3 is a flow diagram of an example ad customization process 300. The process 300 may provide customized ad content for display as an ad 216 in an ad portion 210 on a content page 206. For example, one or more elements in the advertising system 100 may perform the process 300. For illustrative purposes, the process 300 shall be described in reference to the architecture shown in FIG. 1 and FIG. 2; the process 300, however, may be applied to different architecture configurations other than FIG. 1 and FIG. 2.

The process 300 begins with the receipt of document content (step 302). The user access device 108a may send information about the content page 212 to the AMS 106. In some implementations, the document content may be a DOM used to represent a content page (e.g., content page 206). In some implementations, the document content may be a DOM that also includes cascading style sheets used to represent a content page (e.g., content page 206). In some implementations, the document content may be captured display image information from the user access device (e.g., a bitmap file representation of the displayed content page 206 on user access device 108a). In some implementations, the document content may include a DOM representing a content page and style information associated and stored with the content page in a content repository (e.g., content repository 124).

Characteristics associated with the document are then identified (step 304). In some implementations, the AMS 106 may analyze the document content received in step 302 (a DOM representing a content page) to determine the computed style of document nodes. The style characteristics identified may include font style information (e.g., font type, font size, font color, font format, etc.) for each DOM node (e.g., the title, the header, the footer, etc.). The style characteristics may also include the color style information (e.g., background color). In some implementations, the AMS 106 may perform an OCR operation on the document content received in step 302 (a bitmap file representation of a displayed content page) to identify style characteristics. In some implementations, the AMS 106 may review information associated with the document content to identify style characteristics.

One or more ads to be displayed in the document are identified (step 306). In some implementations, the AMS 106 may deliver ads (associated with the advertisers 102) to the user access device 108a when a user accesses content from the publisher 104a. In some implementations, the AMS 106 may allow the publisher 104a to search and select specific products and services as well as associated ads for display with content provided by the publisher 104a. The publisher 104a may search through ads in the ad repository 126 and select certain ads for display with their content.

Identified ads can be customized based on identified characteristics (step 308). The AMS 106 may use the style information gathered from the analysis of the document content to determine how to render an ad for display on a content page (e.g., ad 216 in ad portion 210 of content page 206). In some implementations, the analysis of the style information may include techniques, previously described with reference to FIG. 2, to determine a "best guess" style to apply to an ad. The "best guess" style may render an ad that will be noticed and interacted with by the user.

The customized ads can be presented along with the document (step 310). In some implementations, the AMS 106 may send a code snippet 208 to the publisher 104a and/or the user access device 108a. As the user access device 108a loads the content page 206, the code snippet 208 causes the user access device 108a to contact the AMS 106 and receive additional code (e.g., Java Script®), which causes the content page 206 to load with an ad portion 210. The ad portion 210 may be hosted by the AMS 106 or the publisher 104a and may allow content (e.g., ads) from the AMS 106 or the publisher 104a to be embedded inside the content page 206. Ads, each including their associated style information, may be included in the ad information 214 that the AMS 106 sends to the user access device 108a. The ad information 214 may include one or more ads 216 for placement in the ad portion 210 of the content page 206. Ads included in the ad information 214 may populate the ad portion 210 of the content page 206 (e.g., ad 216).

Alternate Ad Customization Process

Figure 4:
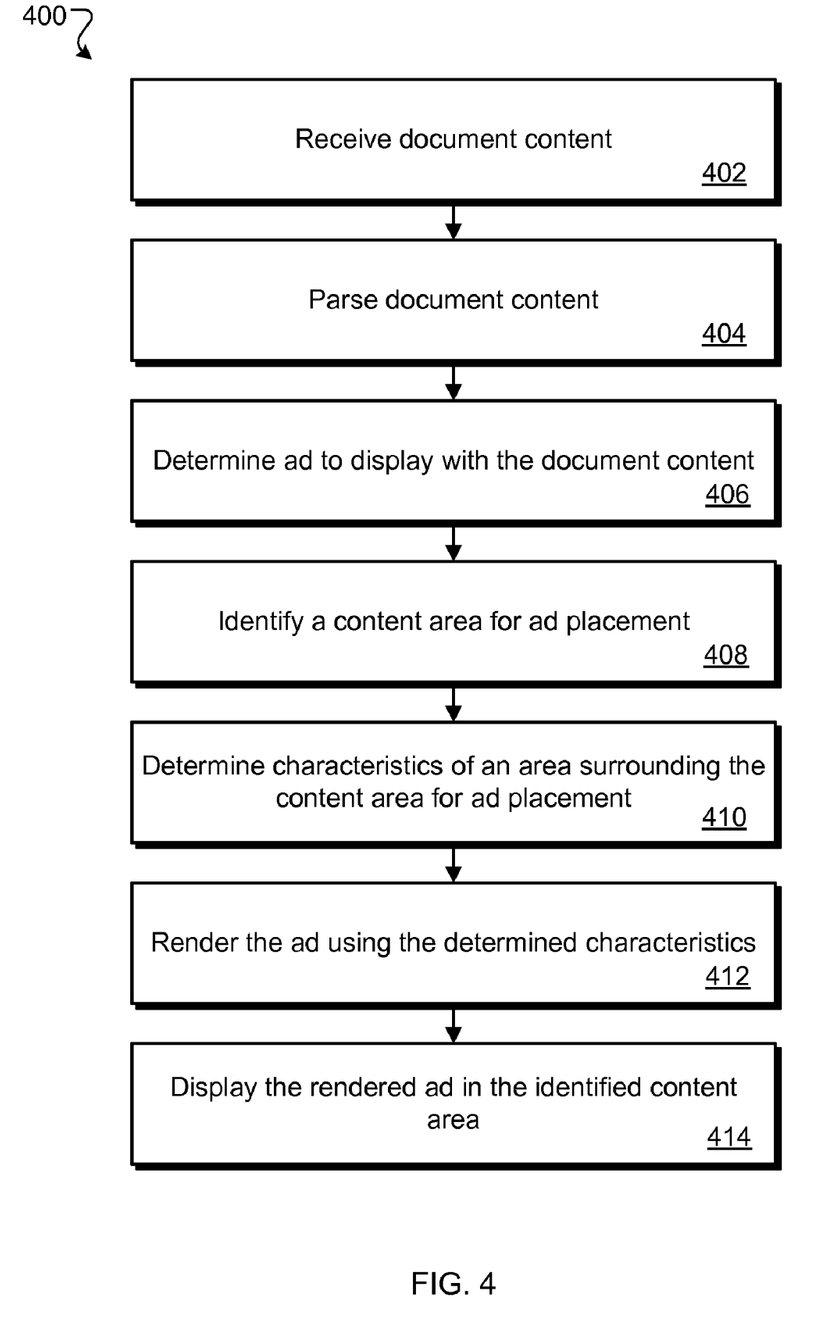
FIG. 4 is a flow diagram of an alternate example ad customization process.

FIG. 4 is a flow diagram of an alternate example ad customization process 400. The process 400 may provide customized ad content for display as an ad in an identified content area of a content page (e.g., ad 216 in ad portion 210 on content page 206). For example, one or more elements in the advertising system 100 may perform the process 400. For illustrative purposes, the process 400 shall be described in reference to the architecture shown in FIG. 1 and FIG. 2; the process 400, however, may be applied to different architecture configurations other than FIG. 1 and FIG. 2.

The process 400 begins with the receipt of document content (step 402). The user access device 108a may send information about the content page 212 to the AMS 106. In some implementations, the document content may be a DOM used to represent a content page (e.g., content page 206). In some implementations, the document content may be a DOM that also includes cascading style sheets used to represent a content page (e.g., content page 206). In some implementations, the document content may be captured display image information from the user access device (e.g., a bitmap file representation of the displayed content page 206 on user access device 108a). In some implementations, the document content may include a DOM representing a content page and style information associated and stored with the content page in a content repository (e.g., content repository 124).

The document content is parsed (step 404). In some implementations, the document content may be a DOM representing a content page. The AMS 106 may parse the DOM to determine the computed style of document nodes, and the location within the document to display ads (e.g., ad portion 210). In some implementations, the document content may be a bitmap file representation of the displayed content page 206 on user access device 108a. The AMS 106 may perform an OCR on the bitmap file, and parse the resulting information to identify style characteristics, and the location within the document to display ads (e.g., ad portion 210). In some implementations, the AMS 106 may parse additional information associated with the document content to identify style characteristics. The AMS 106 may then parse the document content to determine the location within the document to display ads (e.g., ad portion 210).

An ad to display in the document is identified (step 406). In some implementations, the AMS 106 may deliver an ad (associated with an advertiser (one of the advertisers 102)) to the user access device 108a when a user accesses content from the publisher 104a. In some implementations, the AMS 106 may allow the publisher 104a to search and select specific products and services as well as associated ads for display with content provided by the publisher 104a. The publisher 104a may search through ads in the ad repository 126 and select an ad for display with their content.

A content area for ad placement is determined (step 408). The identified content area for ad placement may be ad portion 210. The AMS 106 or the publisher 104a may host the ad portion 210. The ad portion 210 may allow content (e.g., ads) from the AMS 106 or the publisher 104a to be embedded inside the content page 206. In some implementations, the AMS 106 may send the code snippet 208 to the publisher 104a and/or the user access device 108a. As the user access device 108a loads the content page 206, the code snippet 208 causes the user access device 108a to contact the AMS 106 and receive additional code, which causes the content page 206 to load with an ad portion 210.

The characteristics of the area proximal (e.g., surrounding) the content area for ad placement may be determined (step 410). The identified content area for ad placement may be ad portion 210 on content page 206. The AMS may use the parsed document content gathered in step 404 from parsing the content page (e.g., content page 206) to determine style characteristics of the area surrounding the ad portion 210 of the content page 206. As described in FIG. 2, various weighting techniques may be applied to the determined characteristics of the area surrounding the content area for ad placement to determine a "best guess" for the style characteristics to use for ad rendering.

The ad can be rendered using the determined characteristics (step 412). In some implementations, the AMS 106 may send a code snippet 208 to the publisher 104a and/or the user access device 108a. As the user access device 108a loads the content page 206, the code snippet 208 causes the user access device 108a to contact the AMS 106 and receive additional code, which causes the content page 206 to load with an ad portion 210. The ad portion 210 may be hosted by the AMS 106 or the publisher 104a and may allow content (e.g., ad 216) from the AMS 106 or the publisher 104a to be embedded inside the content page 206. The ad and its associated style information may be included in the ad information 214 that the AMS 106 sends to the user access device 108a for rendering.

The rendered ad can be displayed in the identified content area of the document (step 414). The ad information 214 sent from the AMS 106 to the user access device 108a may include the ad 216 for placement in the ad portion 210 of the content page 206. After rendering the ad using the determined characteristics (step 412), the user access device 108a may populate the ad portion 210 of the content page 206 with the ad (e.g., ad 216) for display to the user.

Screen Shot of a Customized Ad

Figure 5A:
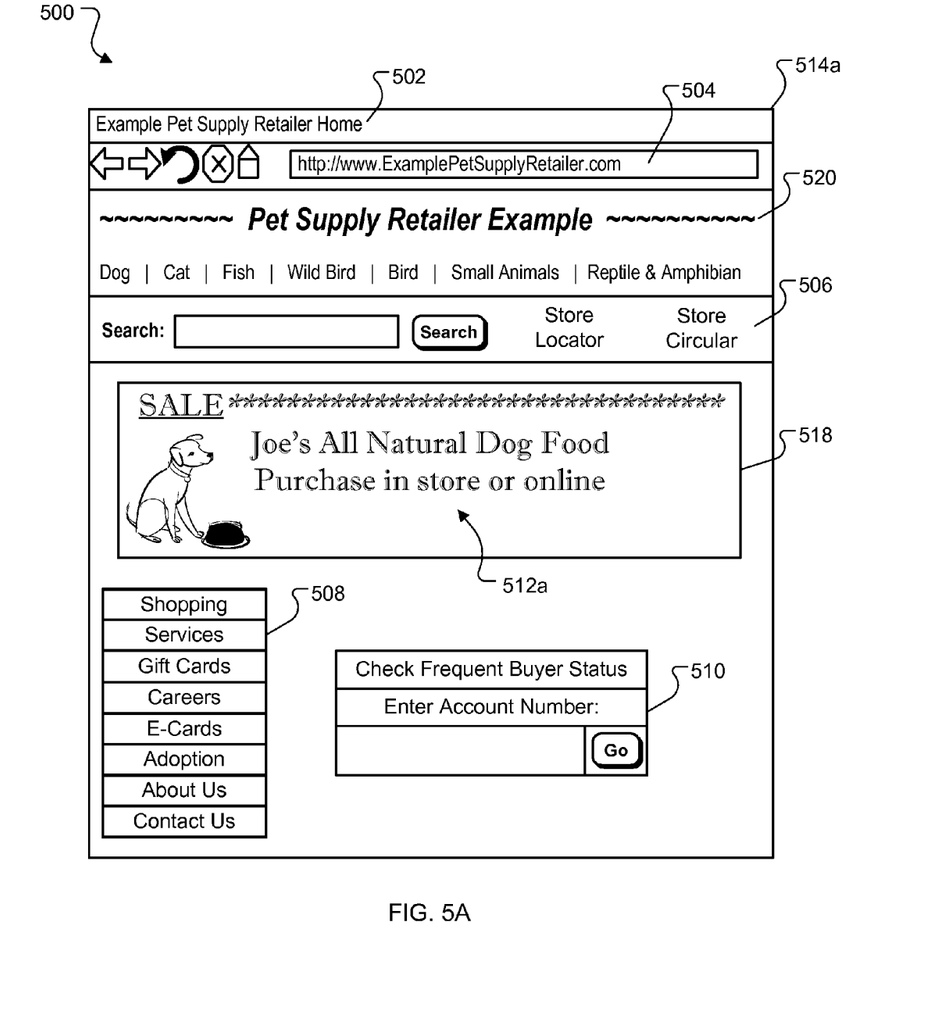
FIG. 5A depicts an example screen shot of a web page that includes an ad.

FIG. 5A depicts an example screen shot 500 of a web page 514a that includes ad 512a. As shown in FIG. 5A, the web page title 502 is "Example Pet Supply Retailer Home." The web page URL or hyperlink 504 is "http://www.ExamplePetSupplyRetailer.com." The web page content relates to the retailing of pet supplies for various species of animals as shown by web page content 506, 508, 510, 516. For example, user access device 108a, as shown in FIG. 1 and FIG. 2, may display the web page 514a.

The user access device 108a may display an ad 512a in an ad portion 518 included on the web page 514a along with the other web page content (e.g., content 506, 508, 510, 516). As shown in FIG. 5A, the text included in the web page content 506, 508, 510, 516, a site title 506, the web page title 502, and the hyperlink 504 are rendered using Arial type fonts. For example, the site title 520 is rendered using a boldfaced, 18 point Arial type font. The text included in the content 506, 508, 510, 516, the web page title 502, and the hyperlink 504 are rendered using a 12 point Arial type font. The ad 512a is rendered using an 18 point Imprint MT shadow type font. The use of a different font type for the ad 512a may not allow it to integrate well into its surroundings.

For example, though not shown in FIG. 5A, the same color may be used for the rendered fonts for the content 506, 508, 510, 516, the site title 506, the web page title 502, and the hyperlink 504 whereas the color used for the rendered font for the ad 512a may be different. The font type, font size, and font color differences between the web page content and the rendered ad may contribute to the lack of integration of the ad 512a into its web page surroundings.

For example, though not shown in FIG. 5A, the color used for the background color of the web page 514a may be one color, the background color for web page content 508 and 510 may be a second color, and the background color for the ad portion 518 may be a third color. The color selected for the ad portion 518 may not integrate well into the color scheme of the web page as determined by the colors used for the other potions of the web page. Therefore, the ad 512a may not integrate well into its web page surroundings.

Figure 5B:
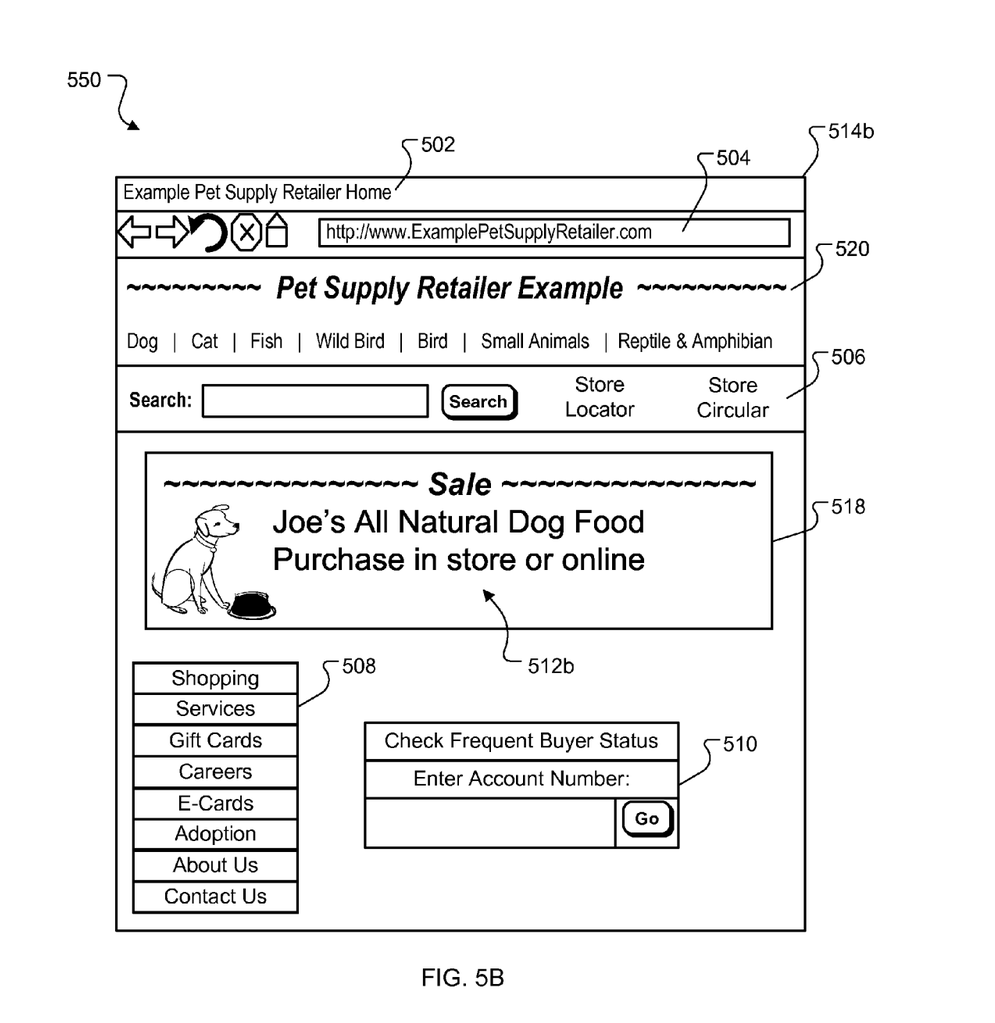
FIG. 5B depicts an example screen shot of a web page that includes a customized ad.

FIG. 5B depicts an example screen shot 550 of a web page 514b that includes a customized ad 512b. As shown in FIG. 5B, the text included in the web page content 506, 508, 510, 516, the site title 506, the web page title 502, and the hyperlink 504 are rendered using Arial type fonts. In the example screen shot 550, the ad 512b is also rendered using Arial type fonts. For example, user access device 108a, as shown in FIG. 1 and FIG. 2, may display the web page 514b.

As described previously, the advertising system 100 may identify characteristics associated with a web page and customize an ad based on the identified characteristics. The advertising system 100 may render the ad using the identified characteristics to produce a customized ad. The advertising system 100 may identify a content area (e.g., content area 518) for the customized ad placement (e.g., customized ad 512b) on a web page (e.g., web page 514b), resulting in the display of the web page (e.g., web page 514b) on a user device (e.g., user access device 108a) that includes the customized ad (e.g., customized ad 512b). For example, the identified font type of the web page 514b is Arial type font. This font type may then be used to render the ad 512a, resulting in the customized ad 512b in web page 514b. The customized ad 512b may be rendered in the same font type and may be customized to use the same font size (e.g., 18 point), font style (e.g., bold italics), and same title formatting (e.g., use of "~"s, centering of text in title) as other titles (e.g., site title 520) on the web page 514b.

For example, though not shown in FIG. 5B, the same color may be used for the rendered fonts for the content 506, 508, 510, 516, the site title 506, the web page title 502, and the hyperlink 504. This same color may then be used for the rendered fonts for the customized ad 512b. The use of a the same font type, font size, font color, and font style for the rendered text in the customized ad 512b may allow it to integrate well into its surroundings, making it more noticeable to the user which may result in increased user interaction with the ad.

Though not shown in FIG. 5B, a color may be used for the ad portion 518 that allows it to integrate well with the color scheme of the web page. For example, the background color for the ad portion 518 may be chosen to match the color used for web page content 508 and 510, allowing it to integrate well with the color scheme of the web page.

Generic Computer System

Figure 6:
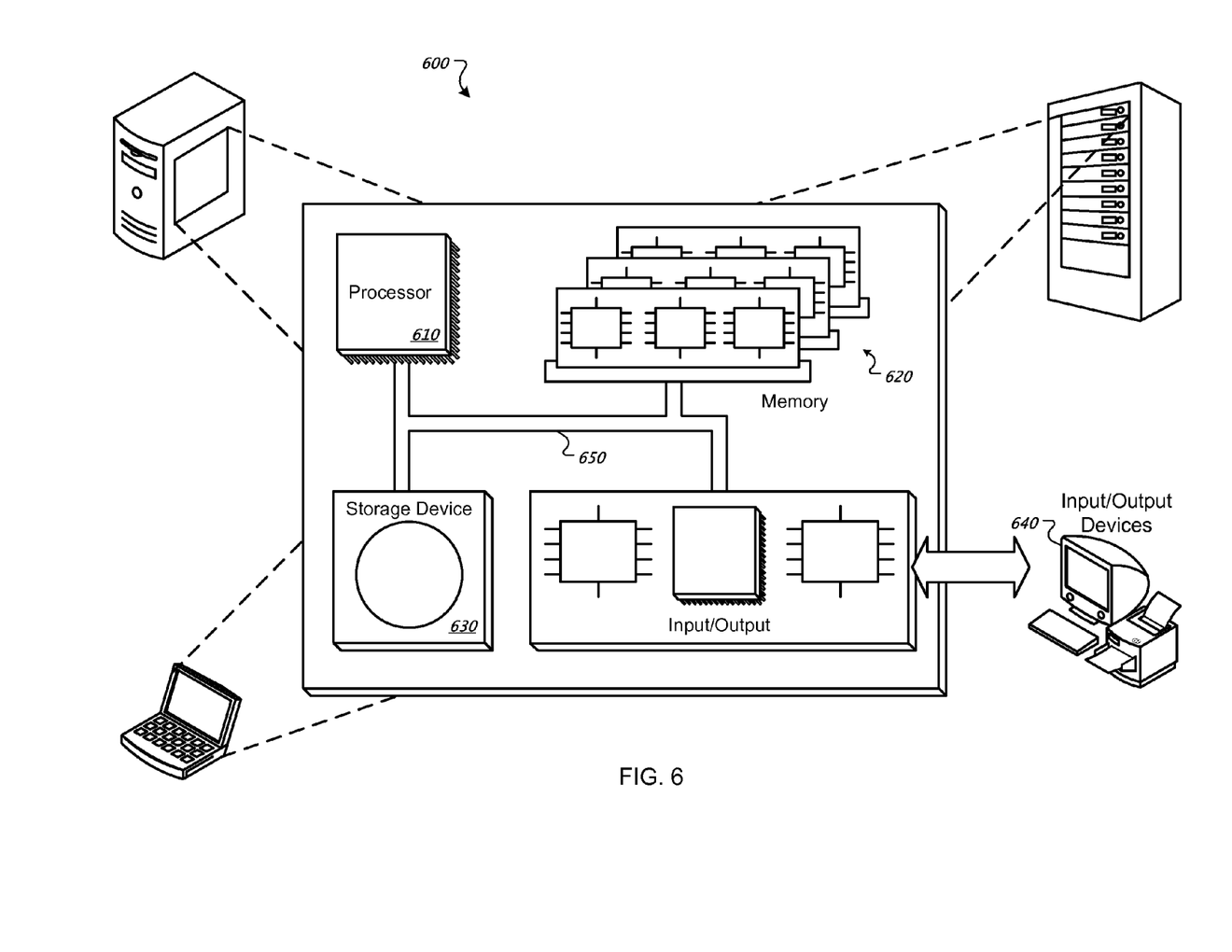
FIG. 6 is a block diagram of generic processing device that may be used to execute methods and processes disclosed.

FIG. 6 is a block diagram of generic processing device that may be used to execute methods and processes disclosed. The system 600 may be used for the operations described in association with the method 300 according to one implementation. The system 600 may also be used for the operations described in association with the method 400 according to another implementation. For example, the system 600 may be included in either or all of the advertising management system 106, the publishers 104, and the advertisers 102.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The storage device 630 may be used, for example, to store information in the content repository 124, and the ad repository 126.

The input/output device 640 provides input/output operations for the system 600. In one implementation, the input/output device 640 includes a keyboard and/or pointing device. In another implementation, the input/output device 640 includes a display unit for displaying graphical user interfaces.

The features described may be implemented in digital electronic circuitry, or in computer hardware, firmware, software, or in combinations of them. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   identifying content of a document;
   identifying one or more characteristics associated with the content, wherein the one or more characteristics include one or more presentation characteristics of the content;
   customizing, using one or more computers, one or more advertisements based on the identified characteristics, wherein customizing one or more advertisements comprises customizing a presentation of the one or more advertisements based on the one or more identified presentation characteristics of the content; and
   transmitting the customized advertisements for display in the document.

2. The method of claim 1, where identifying one or more characteristics associated with the content includes identifying font characteristics associated with the content.

3. The method of claim 2, where identifying font characteristics associated with the content includes identifying a dominant font used within the content.

4. The method of claim 1, where identifying one or more characteristics associated with the content includes:
   applying a matching function to an area used for displaying an advertisement to determine one or more characteristics associated with the area if the advertisement were a block of text.

5. The method of claim 1, where identifying one or more characteristics associated with the content includes:
   analyzing a document object model (DOM) associated with the document;
   identifying one or more nodes associated with the content from the document object model; and
   determining one or more characteristics associated with the identified nodes.

6. The method of claim 5, where determining one or more characteristics associated with the identified nodes includes:
   weighting the identified nodes based on a predetermined criteria associated with each node;
   identifying a node with a highest weight; and
   determining one or more characteristics associated with the identified node with the highest weight.

7. The method of claim 6, where weighting the identified nodes based on a predetermined criteria associated with each node includes weighting the nodes based on a length of text associated with a node.

8. The method of claim 7, where weighting the nodes based on a predetermined criteria associated with each node includes weighting the nodes based on a pixel area covered by each node.

9. The method of claim 7, where weighting the nodes based on a predetermined criteria associated with each node includes weighting the nodes according to a distance of a node from a center of a viewing area used for displaying the customized advertisements.

10. The method of claim 1, where identifying one or more characteristics associated with the content includes identifying a color scheme associated with the content.

11. The method of claim 1, where identifying one or more characteristics associated with the content includes:
- analyzing a document object model (DOM) associated with the document;
- identifying one or more nodes associated with the content from the document object model;
- applying a Monte Carlo sampling to the one or more nodes to statistically determine font style information to be used for customizing the one or more advertisements.

12. A method comprising:
- parsing content of a document;
- identifying a content area for placement of an advertisement;
- determining, using one or more computers, one or more characteristics of content surrounding the content area, wherein the one or more characteristics include one or more presentation characteristics; and
- transmitting the advertisement for rendering using the one or more determined presentation characteristics.

13. A method comprising:
- receiving information specifying an ad rendering area in a document;
- determining, using one or more computers, one or more characteristics associated within the specified ad rendering area, wherein the one or more characteristics include one or more presentation characteristics; and
- applying the one or more presentation characteristics to one or more advertisements prior to transmitting the one or more advertisements for display.

14. A system comprising:
- a processor; and
- a computer-readable medium operatively coupled to the processor and including instructions, which, when executed by the processor, causes the processor to perform operations comprising:
- analyzing content of a document;
- identifying one or more characteristics associated with the content, wherein the one or more characteristics include one or more presentation characteristics of the content;
- customizing one or more advertisements based on the identified characteristics, wherein customizing one or more advertisements comprises customizing a presentation of the one or more advertisements based on the one or more identified presentation characteristics of the content; and
- transmitting the customized advertisements for display in the document.

15. A system comprising:
- a processor; and
- a computer-readable medium operatively coupled to the processor and including instructions, which, when executed by the processor, causes the processor to perform operations comprising:
- parsing content of a document;
- identifying a content area for placement of an advertisement;
- determining one or more characteristics of content surrounding the content area, wherein the one or more characteristics include one or more presentation characteristics; and
- transmitting the advertisement for rendering using the one or more determined presentation characteristics.

16. A system comprising:
- a processor; and
- a computer-readable medium operatively coupled to the processor and including instructions, which, when executed by the processor, causes the processor to perform operations comprising:
- receiving information specifying an ad rendering area in a document;
- determining one or more characteristics associated within the specified ad rendering area, wherein the one or more characteristics include one or more presentation characteristics; and
- applying the one or more presentation characteristics to one or more advertisements prior to transmitting the one or more advertisements for display.

17. A computer-readable medium having instructions stored thereon, which, when executed by a processor, causes the processor to perform operations comprising:
- analyzing content of a document;
- identifying one or more characteristics associated with the content, wherein the one or more characteristics include one or more presentation characteristics of the content;
- customizing one or more advertisements based on the identified characteristics, wherein customizing one or more advertisements comprises customizing a presentation of the one or more advertisements based on the one or more identified presentation characteristics of the content; and
- transmitting the customized advertisements for display in the document.

18. A computer-readable medium having instructions stored thereon, which, when executed by a processor, causes the processor to perform operations comprising:
- parsing content of a document;
- identifying a content area for placement of an advertisement;
- determining one or more characteristics of content surrounding the content area, wherein the one or more characteristics include one or more presentation characteristics; and
- transmitting the advertisement for rendering using the one or more determined presentation characteristics.

19. A computer-readable medium having instructions stored thereon, which, when executed by a processor, causes the processor to perform operations comprising:
- receiving information specifying an ad rendering area in a document;
- determining one or more characteristics associated within the specified ad rendering area, wherein the one or more characteristics include one or more presentation characteristics; and
- applying the one or more presentation characteristics to one or more advertisements prior to transmitting the one or more advertisements for display.

20. A method comprising:
- identifying content of a media item;
- identifying one or more characteristics associated with the content, wherein the one or more characteristics include one or more presentation characteristics associated with the content;
- customizing, using one or more computers, one or more advertisements based on the identified characteristics, wherein customizing one or more advertisements includes customizing a presentation of the one or more advertisements based on the one or more presentation characteristics associated with the content; and
- transmitting the customized advertisements for presentation with the media item.

* * * * *